June 7, 1949.  F. W. GAY  2,472,657
MEANS FOR DISCONNECTING A FAULTED FEEDER
CIRCUIT FROM A POWER CIRCUIT
Filed May 8, 1945  4 Sheets-Sheet 3
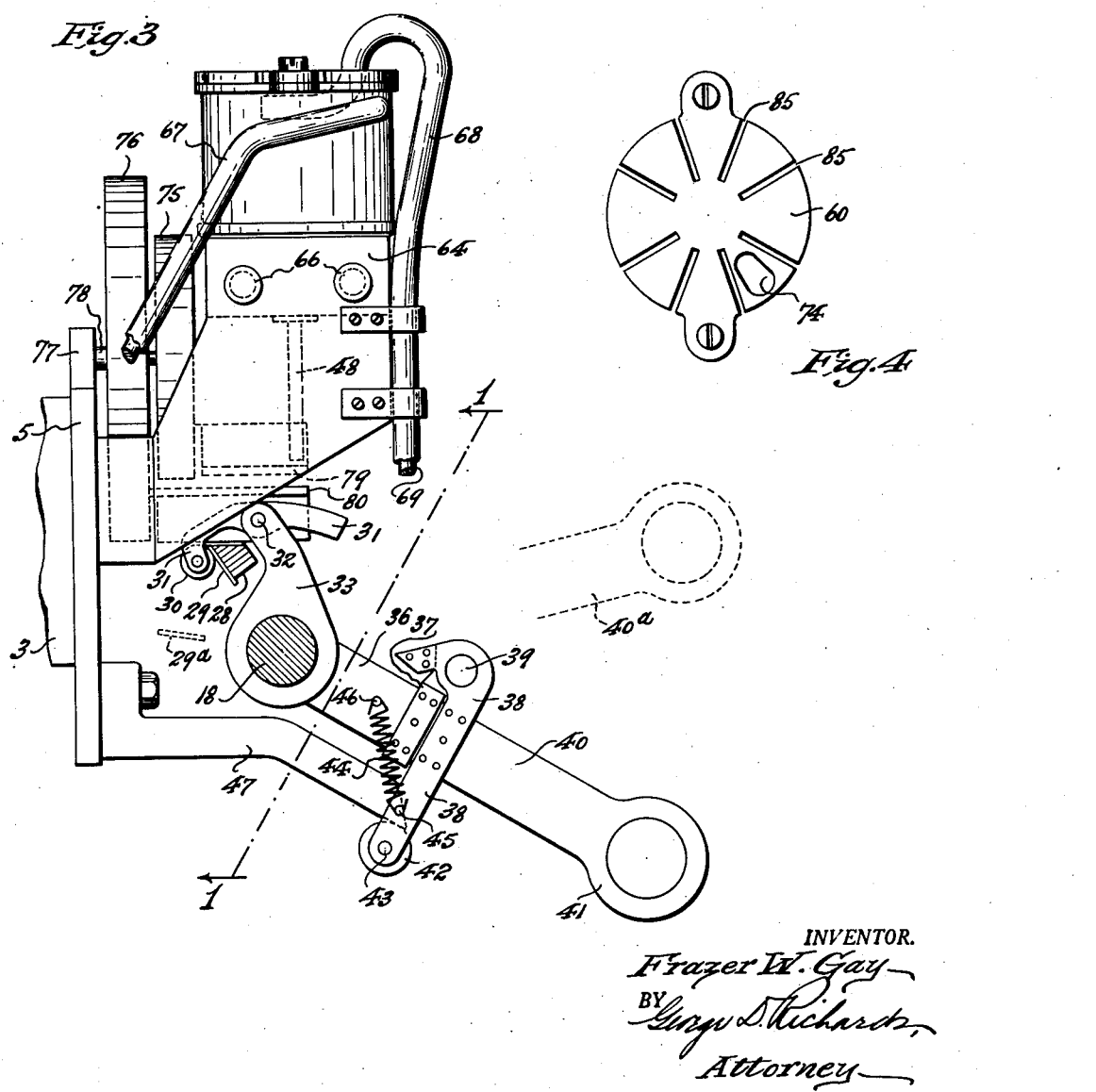
INVENTOR.
Frazer W. Gay
BY George D. Richards
Attorney June 7, 1949.

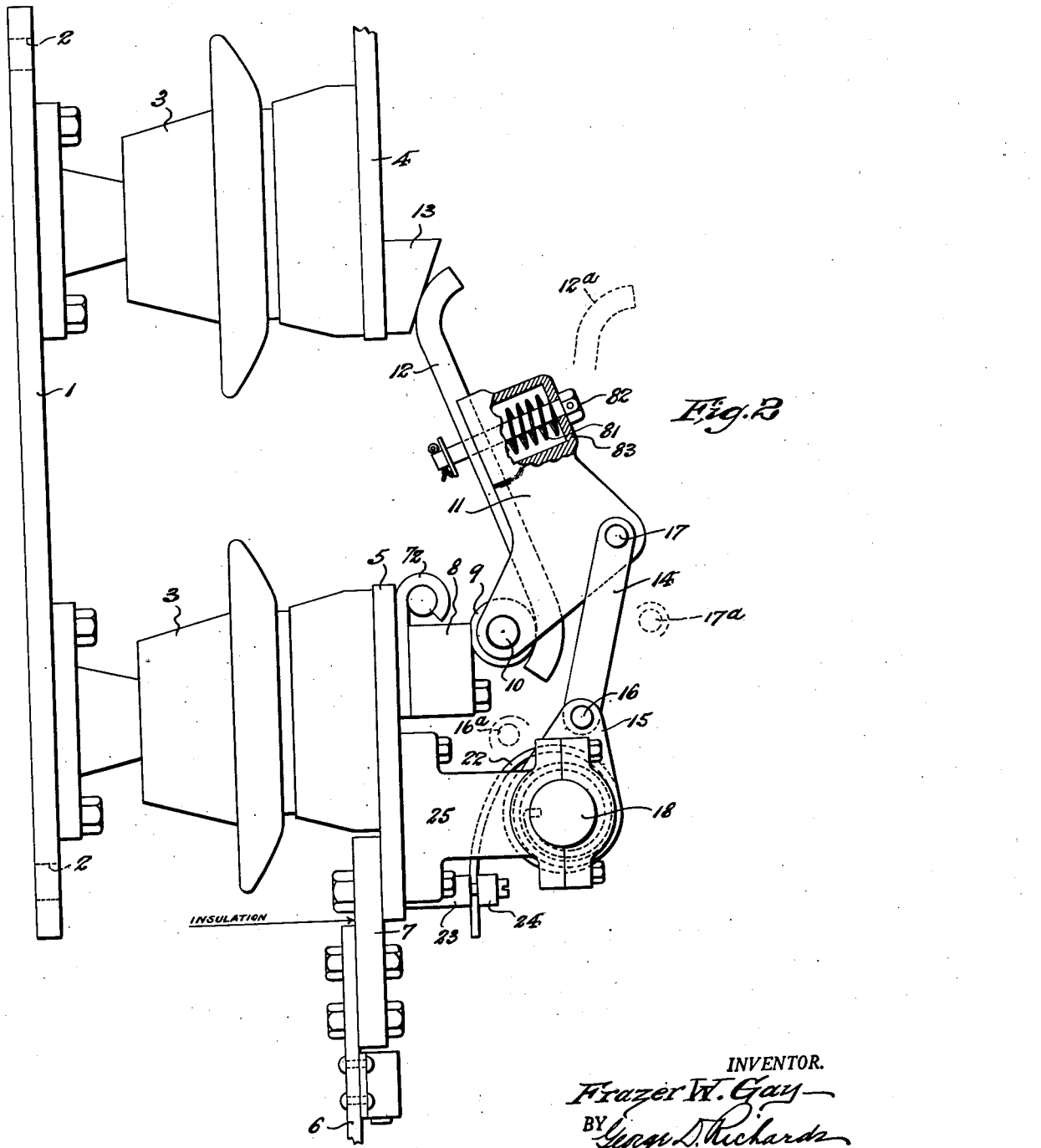

F. W. GAY 2,472,657

MEANS FOR DISCONNECTING A FAULTED FEEDER
CIRCUIT FROM A POWER CIRCUIT

Filed May 8, 1945

INVENTOR.
Frazer W. Gay
BY George D. Richards,
Attorney

UNITED STATES PATENT OFFICE 2,472,657

MEANS FOR DISCONNECTING A FAULTED FEEDER CIRCUIT FROM A POWER CIRCUIT

Frazer W. Gay, Metuchen, N. J.

Application May 8, 1945, Serial No. 592,620

4 Claims. (Cl. 200—108)

This invention relates to a novel device for disconnecting a faulted feeder circuit from a main power circuit for a desired interval during which the main power circuit breaker remains open.

Due to the considerable expense involved in a circuit breaker and its associated equipment (which may include feeder voltage regualtors, feeder reactors, relays, and similar adjuncts), it is becoming customary to connect two or more high capacity three phase feeder circuits to a single circuit breaker, and to rely on fuses to interrupt the single phase circuits tapped off from these three phase power feeder circuits.

This customary practice makes necessary the disconnecting of all circuits connected to the power bus through the circuit breaker, in case any fuse connected to any phase circuit fails to interrupt the faulted circuit. In unattended substations it will generally be many minutes and sometimes hours before an operator arrives, determines the faulted single phase feeder circuit, and then disconnects this circuit and recloses the circuit breaker.

This customary practice further requires the installation of many more fuses than will be required by circuits protected by the device of the instant invention. Each such fuse entails considerable expense to a utility, since fuses located near the power source are subject to current surges of high value and hence many fail to successfully interrupt the current, thereby causing a long power outage not alone with respect to the faulted circuit but to all other circuits connected to a common circuit breaker as explained above.

Statistics show that from 80 to 85 per cent of all short circuits which normally cause a fuse to blow are of a transitory nature, such as small falling limbs, grounding of a line by birds, induced lightning strokes, etc., and, if fuses were not used, 80 to 85 per cent of such faults would not reappear when the circuit breaker was reclosed. Since each blown fuse of the ordinary type requires the services of a lineman to refuse, the expense of fuse trouble may be considerable, and lost revenue is by no means negligible.

With the use of the novel disconnecting device of the present invention, one or more reclosures are permitted before any circuit is disconnected, so that 80 to 85 per cent of all line faults are removed without any substantial outage time, and at no labor cost and consequently with substantially no revenue loss.

In the case of the 15 to 20 per cent of the line faults which are serious, the circuit disconnection is accomplished after one or more reclosings, and only the faulted phase circuit is removed so that the service interrupted and the revenue lost is held to a minimum.

By the present invention, it is proposed to carry away many single phase circuits fed from a single circuit breaker, and to protect each such circuit with a novel disconnecting device according to the present invention.

A disconnecting device comprises a spring opened latched-in disconnecting means and co-operating spring and gravity operated tripping device. This tripping device is brought into operating position by the fault current which raises a weight and causes it to compress a spring. When the circuit breaker opens the fault current is interrupted, and the entire energy stored in the tripping device is released so as to almost instantly trip the disconnecting switch and cause it to open the faulted circuit while the circuit breaker is still in the open position. If the tripping device is allowed to function, the faulted circuit will be interrupted in approximately five cycles in a sixty cycle system.

However, in my novel disconnecting device one or more blocking members are interposed in the path of the tripping member. Each blocking member comprises a pivoted weight of considerable inertia provided with a blocking lug. Each blocking member is arranged to be normally counterbalanced by gravity or by spring pressure so as to position said blocking lug in the path of the tripping member.

When a fault occurs the tripping member is set in the operating position by the fault current, and when this current is first interrupted the tripping member descends and strikes the blocking lug on the pivoted weighty blocking member a smart blow. Since the pivot of the blocking member is nearly but not quite in line with the blow, much of the momentum of the tripping member is absorbed by the blocking member pivot. The balance of the momentum is absorbed by the inertia of the weighty blocking member which is very great with respect to the momentum absorbed, whereby a smart blow by the tripping member upon the blocking lug causes the blocking member to turn slowly and thus remove said blocking lug out of the path of the tripping member. In general, the inertia of the weightly blocking member is so great, and the unbalance which causes it to return to the blocking position is relatively so slight, that several seconds elapse between a blow by the tripping member and the return of the blocking member to a normal blocking position. During this period, the operation of the tripping member is not hampered by the blocking lug. However, a second similar and independent blocking member may be installed in the path of the tripping member, and, in such case, the blocking lug of the first blocking member will be, as stated, driven out of the way following the first switch opening, then if the fault persists the blocking lug of the second blocking member will be driven out of the way following the second switch opening, and following the third switch opening the tripping member (no longer being blocked) will trip the spring operated disconnecting switch, and this switch will remain open until closed by hand.

A further novel feature of my device is a switch handle release means or trip freeing device. When the switch is being closed by hand the tripping mechanism is brought into position to release the switch from the handle at the time the switch blades close so that an operator cannot hold my novel disconnecting device closed against a fault.

In the ordinary case wherein the invention is used, only one blocking member will be employed, and the circuit will be subject to only one reclosure. If the fault on any circuit persists through the period of this reclosure, the faulted circuit will be disconnected.

In the case of a three phase motor circuit, a tripping bar will be set in position to trip all three poles in case one of the three switches is tripped on a fault.

It is an object of the present invention to introduce a plurality of automatically opened disconnecting switches, each in an individual one of a corresponding number of phase circiuts connected to a single circuit breaker, and each such disconnecting switch being adapted to disconnect its circuit after a predetermined number of reclosures.

It is a further object of this invention to provide an individual phase circuit of a transmission system with an automatically opened disconnecting device adapted to be tripped during the open period of an associated circuit breaker, and to provide a blocking member adapted to prevent the tripping of said disconnecting device until after a desired number of reclosures of said circuit breaker.

It is a further object of this invention to provide a trip free device so that the disconnecting device will function to disconnect a circuit in the desired manner during the period the switch is being reclosed by hand.

Other objects of my invention will be understood from the following description, and by reference to the accompanying drawings.

In said drawings;

Fig. 2 is a side elevation of the switch of Fig. 1.

Fig. 3 is a section taken along the line 3—3 of Fig. 1.

Fig. 4 is a plan view of the magnetic spreader means of the switch structure.

Similar characters of reference are employed in the above described views, to indicate corresponding parts.

Figure 1:
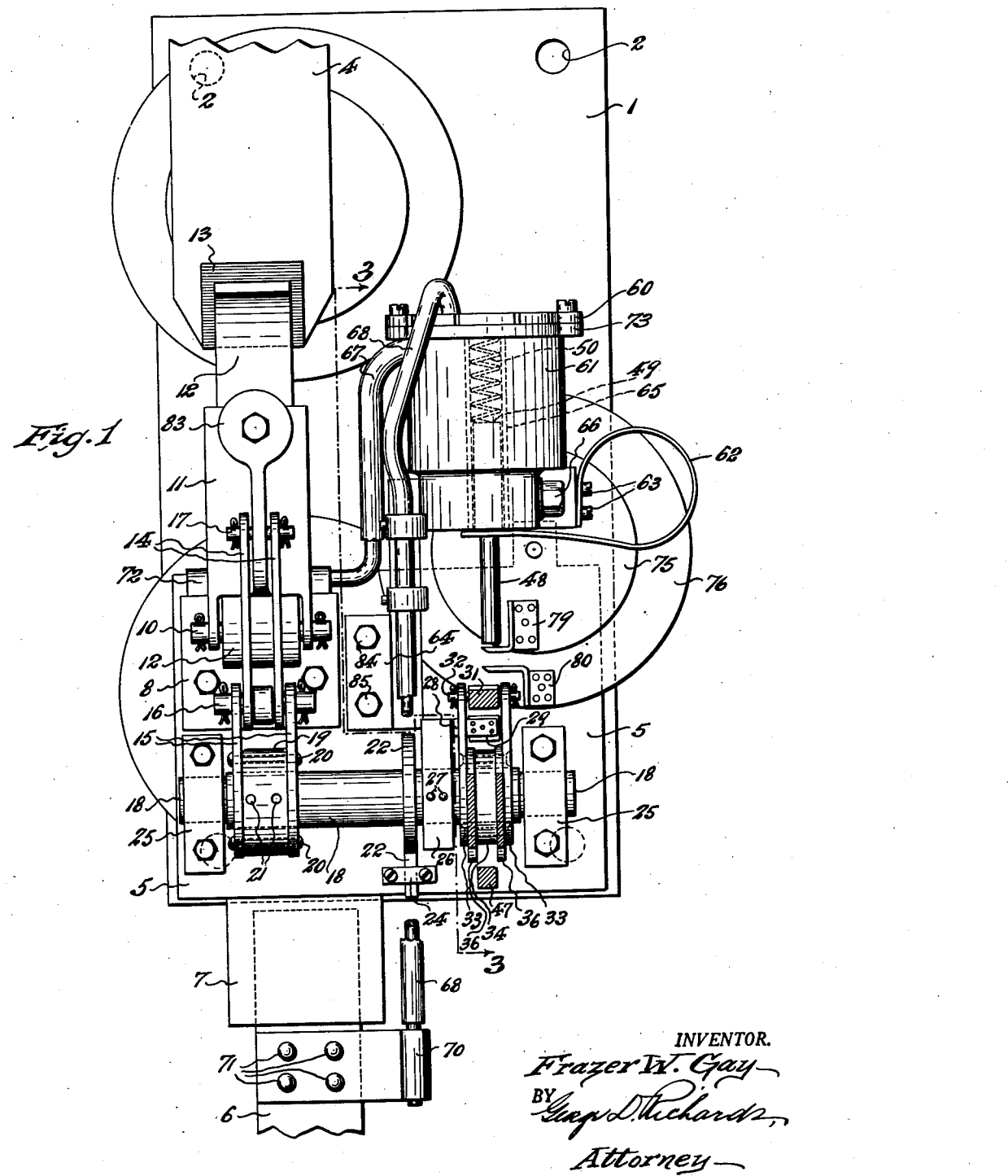
Fig. 1 is a front elevation of the switch of the present invention partly in section along the line 1—1 of Fig. 3.

In Figs. 1 and 2; 1 is a steel base having bolt holes 2, whereby to bolt the base to its support.

The insulators 3, 3 are mounted on base 1, and conducting plates 4 and 5 are secured to the insulator caps by bolting or brazing. The outer end of conducting jaw plate 4, which is drilled for terminal bolts in the usual manner, has been omitted. The drilled outer end of terminal plate 6 has also been omitted. This terminal plate 6 is insulated from and attached to conducting plate 5 by the insulating block 7. A hinge block 8 is securely bolted to conducting plate 5, and serves to clamp a cable lug 72 to plate 5. A conducting cylinder 9 is securely brazed to block 8. This cylinder 9 contains a hinge pin 10. This hinge pin 10 pivots clamp block 11 to which is fastened the conducting link 12. Conducting link 12 is pressed firmly against switch jaw 13 and cylinder 9 by spring 81. Spring 81 is mounted in a spring housing 83, and its action is restrained by a blot 82. Clamp block 11 is held in the switch closed position by connecting links 14, 14 and pins 16 and 17. Pin 16 is held in position by crank arms 15, 15 which are mounted on a shaft 18. Crank arms 15, 15 are secured to hub 19 by rivets 20, 20, and hub 19 is pinned to shaft 18 by pins 21, 21. Shaft 18 is free to turn in its bearing 25, 25 but is normally in the switch closed position as shown until tripped. A powerful spring 22 is secured to the shaft by its inner end and is adjustably secured by its outer end to clamp 24, which clamps it against fixed lug 23. Spring 22 operates to turn shaft 18 (Fig. 2) counter-clockwise, so that, when the swtich is tripped, the center of pivot 16 takes the position 16a and pivot 17 takes the position 17a and conducting link 12 takes the open position 12a.

The method of latching the switch closed, and the method of tripping the switch is shown in Fig. 1 and Fig. 3. A crank 26 is firmly secured to shaft 18 by pins 27, 27. A lug 28 has a hardened plate 29 riveted to it so as to be latched in position by the roller 30 attached to the end of arm 31 which is pivoted in the center on pin 32. Pin 32 is carried by crank arms 33, 33 pinned to hub 34. Hub 34 and crank arms 33, 33 turn freely on shaft 18. The two arms 36, 36 are also firmly secured to crank arms 33, 33. A lug 37 to which pivot pin 39 is attached is riveted to arms 36, 36. Handle 40 with its side end plates 38, 38 also pivots about pin 39. A switch stick ring 41 is also riveted to handle 40. A roller 42 mounted on pin 43 engages stop 47. A spring 44 holds roller 42 in the engaged position. To close the switch; handle 40 is moved to the position 40a so that roller 30 moves counter-clockwise, and rolls up and over the lug 28 so as to engage plate 29 which is in position 29a (Fig. 3) when switch is open. After roller 30 has engaged plate 29, handle 40 is brought from position 40a to position 40, and shaft 18 rotates clockwise to close the switch, while roller 43 latches over stop 47 so that the switch is latched in.

A heavy cast iron lug 64 is bolted to conducting plate 5 by bolts 84 and 85. Trip coil 61 is wound on a Bakelite insulator frame which, in turn, is bolted to said heavy cast iron lug 64 by bolts 66, 66. An armature 49 (shown dotted) has a trip member or rod 48 attached at the bottom and is supported by spring 62. The strength of spring 62 is adjusted by moving it under clamp screws 63, 63 until it just supports the weight of armature 49 and trip rod 48. When a heavy current flows in coil 61, armature 49 will be raised in Bakelite tube 65 and will compress spring 50 as said armature is drawn up hard toward magnetic plate 60 (preferably of cast iron). Current flows from lug 72 (Fig. 2) via lead 67 (Fig. 1) through coil 61 and over lead 68 to lug 70. Trip rod 48 is just clear of lug 79 and cannot drop freely to strike rocker arm 31, and thus to trip the switch, until blocking lug 79 is withdrawn out of the way. Blocking lug 79 is mounted on a pivoted blocking member which preferably comprises a fly wheel 75. Fly wheel 75 is mounted on frictionless bearings on shaft 78 fastened to lug 77 (Fig. 3). In the same way lug 80 is mounted on a similar blocking member comprising a fly wheel 76 and will not permit trip rod 48 to pass until it also has been struck once and driven away.

Fig. 4 shows the cast iron magnetic plate 60 of Fig. 1. This plate 60 has many slots 85, 85, etc. cut in radially to reduce eddy currents. A large slot 74 is cut to allow the inside coil lead 68 to pass. Magnetic plate 60 is attached to the Bakelite spool 73 by screws as shown in Fig. 1.

The operation of this device is as follows:

The number of turns on trip coil 61 is so chosen that a current great enough to raise armature 49 is also great enough to trip the associated protecting and reclosing circuit breaker. In all congested districts, and in most country districts, a short circuit on a branch feeder will trip the circuit breaker. All remote faults not sufficiently heavy to trip the breaker must be removed by fuses. When a heavy fault occurs, armature 49 will be lifted and spring 50 will be compressed as the armature is pulled up hard toward magnetic plate 60. When the circuit breaker opens, armature 49 is driven violently downward (by the combined action of spring 50 and gravity) causing the trip member or rod 48 to strike blocking lug 79 a smart blow so that the pivoted blocking member provided by fly wheel 75 turns slowly counter-clockwise. In about 30 cycles, the circuit breaker will reclose. If, as is usually the case, the fault is no longer on the circuit, then switch trip armature will not again be lifted but fly wheel 75 will turn slowly until blocking lug 79 strikes coil 61 and reverses its motion. Blocking lug 79 will then slowly return to its initial blocking position, the fly wheel 75 being counterbalanced for such return by the weight of the blocking lug 79.

If, however, the feeder is still faulted when the circuit breaker first recloses, then armature 49 will be raised a second time, and, when it falls, it will strike a smart blow against lug 80 attached to the pivoted blocking member provided by fly wheel 76, so that fly wheel 76 will turn slowly, whereby when the circuit breaker recloses a second time in approximately another 30 cycles and if the fault is still on, armature 49 will again be drawn up. When the circuit breaker opens, armature 49 will again fall and, since both lugs 79 and 80 are out of the way, trip member or rod 48 will strike the tail of rocking bar 31, whereby roller 30 will be lifted to unlatch lug 28, and consequently shaft 18 and the disconnecting device will open to clear the faulted feeder from the system.

Figure 5:
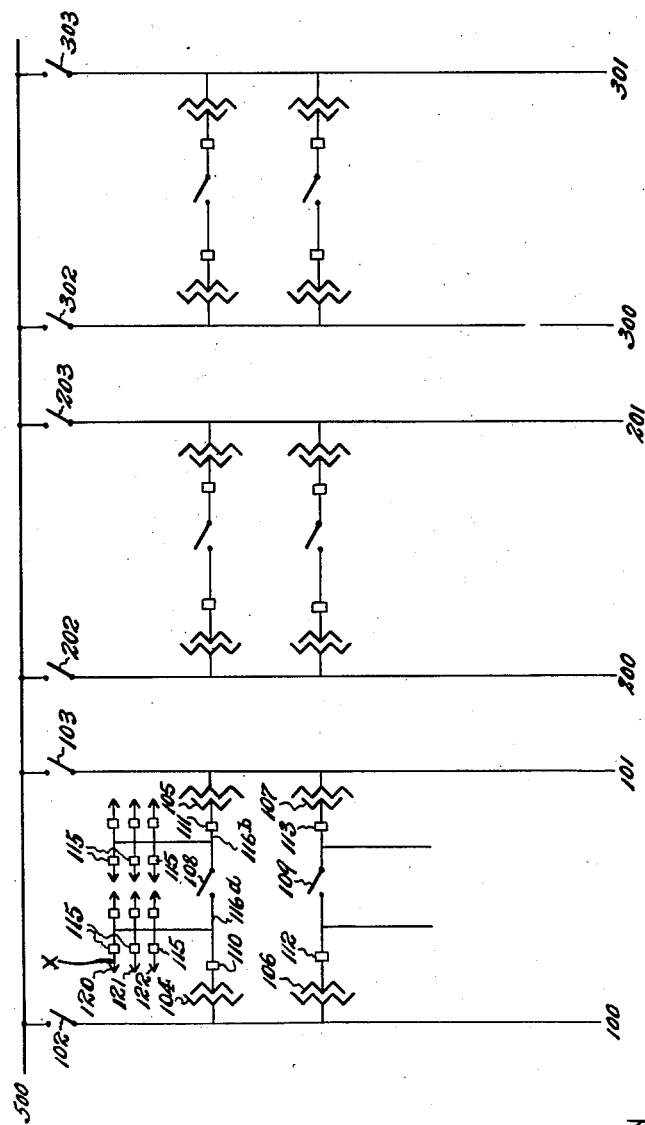
Fig. 5 is a one line diagram illustrating the application of the present invention to circuits to be controlled.

Fig. 5 is a one line diagram and shows three groups of power feeders employing the switching device of the present invention. 100 and 101 designate two high voltage cables (say 33 kv.) feeding one group. Each cable feeds its power to two transformer banks as 104 and 106 for cable 100, and 105 and 107 for cable 101. Each pair of transformer banks, as for example 104 and 105, feed a common bus, as for example 116 (say 4150 volts). This bus is connected to each transformer bank through the circuit breakers 110 and 111. Each bus has a motor operated bus section disconnect as 108 which is normally operated open. This switch is equipped with tripping mechanism of the present invention, and will trip free from the motor closing mechanism as described. Each phase of each bus section, as for example each phase of 116a or 116b feeds a number of feeder circuit disconnecting switches of the present invention, as for example 115, 115, 115, 115.

Bus section switches, as e. g. 108, are equipped with two blocking devices so as not to open until after the second reclosure, while switches 115, 155, etc. are equipped with only a single blocking member. It is to be understood that feeder group 200 and 201, and feeder group 300 and 301, etc. are identical with feeder group 100 and 101. High voltage feeder 500 is a spare for high voltage feeders 100 and 101; 200 and 201; 300 and 301; etc. For instance, if a section of feeder 100 at a distance from the load is in trouble, the faulted section of cable 100 may be sawed off and switch 102 may be closed by hand, thus exciting transformer banks 104 and 106. The operation of this system is as follows:

Assume that a fault occurs on a single phase feeder, as for example at X on feeder 120. At the instant of fault, the tripping member on 115 of circuit 120 is drawn up to the tripping position, and when circuit breaker 110 trips, the tripping member on switch falls and hits its blocking means a smart blow, whereby to quickly drive the blocking member out of the blocking position. If the fault at X persists, the tripping member on the faulted feeder will function as the circuit breaker 110 opens after the first reclosure, and circuit 120 will be cleared from the system. Circuit breaker 110 will now remain in after the second reclosure.

Now suppose the fault is on a main high voltage feeder, as for example 101. Circuit breakers 111 and 113 will generally remain closed, but the associated 4150 volt busses, as for instance 116b, will be dead. A voltage relay on bus 116b will function after a desired time in the usual manner to simultaneously trip circuit breaker 111 and close motor operated disconnecting switch 108. The closing of disconnecting switch 108 will merely add about twice as many feeders to circuit breaker 110 as in the first instance. Since the automatically tripped disconnecting switch 108 has two blocking members functioning in succession, all the switches 115, 115, etc. will disconnect their feeders without opening disconnecting switch 108.

What is claimed is:

1. In combination, a latched-in spring opened disconnecting switch, trip means for releasing said switch, said trip means comprising an electromagnet and cooperative armature, said armature having a trip member adapted, when said armature is retracted upon the excitation of said electro-magnet by a fault current, to be positioned ready for a switch tripping stroke upon interruption of said fault current, a blocking member comprising a pivoted weight of considerable inertia carrying a blocking lug normally disposed thereby in the path of tripping movement of said trip member, whereby to block such movement, said blocking member being adapted to be turned about its pivot under impact of said trip member upon said blocking lug so as to swing the latter out of the path of tripping movement of the trip member, and thereby permit said trip means, upon occurrence of a succeeding fault current, to again retract and release said trip member for a non-blocked tripping stroke, said blocking member being counterbalanced so as to slowly swing back to normal initial blocking position.

2. In combination, a spring opened disconnecting switch, releasable latch means for holding said switch closed, a spring actuated trip member operative to strike and release said latch means, electro-magnetic means for retracting said trip member against the tension of its actuating spring preparatory to operative strokes thereof, said electro-magnetic means being adapted to be energized by fault currents, and a blocking member comprising a pivoted weight of considerable inertia carrying a blocking lug adapted to be normally disposed thereby between said trip member and latch means, said blocking member being adapted to be turned about its pivot under impact of said trip member upon said blocking lug so as to swing the latter out of the path of tripping movement of the trip member, and thereby permit said trip member to be again retracted and released by said electro-magnetic means if the latter is again energized by a fault current, whereby to effect a non-blocked tripping stroke of said trip member, said blocking member being counterbalanced so as to slowly swing back to normal initial blocking position.

3. In combination, a spring opened disconnecting switch, releasable latch means for holding said switch closed, a spring actuated trip member operative to strike and release said latch means, electro-magnetic means for retracting said trip member against the tension of its actuating spring preparatory to operative strokes thereof, said electro-magnetic means being adapted to be energized by fault currents, a blocking member comprising a rotatable fly wheel of considerable inertia, and a blocking lug affixed to said fly wheel so as to be normally disposed by the latter between said trip member and said latch means, said fly wheel being adapted to rotate in one direction under impact of said trip member upon said blocking lug, whereby to carry the latter out of the path of tripping movement of said trip member so as to permit subsequent actuated movement of the trip member to strike and release said latch means, and said fly wheel being counterbalanced by said blocking lug so as to slowly rotate in opposite direction to return said blocking lug to normal initial blocking position.

4. In combination, a spring opened disconnecting switch, releasable latch means for holding said switch closed, a spring actuated trip member operative to strike and release said latch means, electro-magnetic means for retracting said trip member against the tension of its actuating spring preperatory to operative strokes thereof, said electro-magnetic means being adapted to be energized by fault currents, a blocking member comprsing a rotatable fly wheel of considerable inertia, and a blocking lug affixed to said fly wheel so as to be normally disposed by the latter between said trip member and said latch means, a second blocking member also comprising a rotatable fly wheel of considerable inertia, and a second blocking lug affixed to said second fly wheel so as to be normally disposed by the latter between said first mentioned blocking lug and said latch means, both said fly wheels being adapted to rotate in one direction under impact of said trip member upon their blocking lugs, whereby to carry said blocking lugs out of the path of tripping movement of said trip member, each fly wheel being counterbalanced by its blocking lug so as to slowly rotate in opposite direction to return the blocking lugs to normal initial blocking positions.

FRAZER W. GAY.

REFERENCES CITED

The following references are of record in the file of this patent:

UNITED STATES PATENTS

| Number | Name | Date |
|---|---|---|
| 1,159,936 | Harris | Nov. 9, 1915 |
| 1,737,649 | Edsall | Dec. 3, 1929 |
| 1,805,082 | Edsall | May 12, 1931 |
| 1,893,348 | Anderson | Jan. 3, 1933 |
| 1,982,986 | Garlington | Dec. 4, 1934 |
| 2,334,339 | Lemmon | Nov. 16, 1943 |
| 2,387,372 | Watkins et al. | Oct. 23, 1945 |
| 2,387,373 | Watkins et al. | Oct. 23, 1945 |

FOREIGN PATENTS

| Number | Country | Date |
|---|---|---|
| 360,057 | Great Britain | Nov. 5, 1931 |